US008076661B2

(12) United States Patent (10) Patent No.: US 8,076,661 B2
McCarthy et al. (45) Date of Patent: Dec. 13, 2011

(54) THERMALLY SWITCHED OPTICAL DOWNCONVERTING FILTER

(75) Inventors: Wil McCarthy, Lakewood, CO (US); Richard M. Powers, Lakewood, CO (US)

(73) Assignee: RavenBrick LLC, Denver, CO (US)

( * ) Notice: Subject to any disclaimer, the term of this patent is extended or adjusted under 35 U.S.C. 154(b) by 0 days.

(21) Appl. No.: 12/843,218

(22) Filed: Jul. 26, 2010

(65) Prior Publication Data

US 2010/0288947 A1 Nov. 18, 2010

Related U.S. Application Data

(62) Division of application No. 12/019,602, filed on Jan. 24, 2008, now Pat. No. 7,768,693.

(60) Provisional application No. 60/897,184, filed on Jan. 24, 2007, provisional application No. 60/931,068, filed on May 21, 2007.

(51) Int. Cl.
*F21V 9/04* (2006.01)

(52) U.S. Cl. ............ 250/517.1; 359/326; 359/359; 359/885

(58) Field of Classification Search .......... 359/326–332, 359/359, 641, 707, 885; 349/104; 250/517.1
See application file for complete search history.

(56) References Cited

U.S. PATENT DOCUMENTS

| 3,990,784 A | 11/1976 | Gelber |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,641,922 A | 2/1987 | Jacob |
| 4,755,673 A | 7/1988 | Pollack et al. |
| 4,789,500 A | 12/1988 | Morimoto et al. |
| 4,848,875 A | 7/1989 | Baughman et al. |
| 4,871,220 A | 10/1989 | Kohin |
| 4,877,675 A | 10/1989 | Falicoff et al. |
| 4,893,902 A | 1/1990 | Baughman et al. |

(Continued)

FOREIGN PATENT DOCUMENTS

CN 1189224 A 7/1998

(Continued)

OTHER PUBLICATIONS

Author Unknown, "Liquid Crystal Research", http://chirality.swarthmore.edu, printed Aug. 21, 2009.

(Continued)

*Primary Examiner* — Daniel Petkovsek
(74) *Attorney, Agent, or Firm* — Dorsey & Whitney LLP

(57) ABSTRACT

A thermally switched optical downconverting (TSOD) filter is a self-regulating device including a downconverter that converts incoming light at a variety of wavelengths into longer-wavelength radiation and then directs it using one or more bandblock filters in either the inward or outward direction, depending on the temperature of the device. This control over the flow of radiant energy occurs independently of the thermal conductivity or insulating properties of the device and may or may not preserve the image and color properties of incoming visible light. The TSOD filter is energy-efficient as it can be used to regulate the internal temperature and illumination of buildings, vehicles, and other structures without the need for an external power supply or operator signals. The TSOD filter has unique aesthetic and optical properties not found in traditional windows, skylights, stained glass, light fixtures, glass blocks, bricks, or walls.

18 Claims, 10 Drawing Sheets

U.S. PATENT DOCUMENTS

| | | | |
|---|---|---|---|
| 4,899,503 | A | 2/1990 | Baughman et al. |
| 4,964,251 | A | 10/1990 | Baughman et al. |
| 5,009,044 | A | 4/1991 | Baughman et al. |
| 5,025,602 | A | 6/1991 | Baughman et al. |
| 5,111,629 | A | 5/1992 | Baughman et al. |
| 5,152,111 | A | 10/1992 | Baughman et al. |
| 5,193,900 | A | 3/1993 | Yano et al. |
| 5,196,705 | A | 3/1993 | Ryan |
| 5,197,242 | A | 3/1993 | Baughman et al. |
| 5,308,706 | A | 5/1994 | Kawaguchi et al. |
| 5,319,478 | A | 6/1994 | Funfschilling et al. |
| 5,377,042 | A | 12/1994 | Chahroudi |
| 5,481,400 | A | 1/1996 | Borden |
| 5,525,430 | A | 6/1996 | Chahroudi |
| 5,574,286 | A | 11/1996 | Huston et al. |
| 5,881,200 | A | 3/1999 | Burt |
| 5,889,288 | A | 3/1999 | Futatsugi |
| 5,897,957 | A | 4/1999 | Goodman |
| 5,940,150 | A | 8/1999 | Faris et al. |
| 6,099,758 | A | 8/2000 | Verrall et al. |
| 6,122,103 | A | 9/2000 | Perkins et al. |
| 6,218,018 | B1 | 4/2001 | McKown et al. |
| 6,281,519 | B1 | 8/2001 | Sugiyama et al. |
| 6,288,840 | B1 | 9/2001 | Perkins et al. |
| 6,294,794 | B1 | 9/2001 | Yoshimura et al. |
| 6,486,997 | B1 | 11/2002 | Bruzzone et al. |
| 6,493,482 | B1 | 12/2002 | Al-hemyari et al. |
| 6,504,588 | B1 | 1/2003 | Kaneko |
| 6,512,242 | B1 | 1/2003 | Fan et al. |
| 6,559,903 | B2 | 5/2003 | Faris et al. |
| 6,583,827 | B2 | 6/2003 | Faris et al. |
| 6,671,008 | B1 | 12/2003 | Li et al. |
| 6,710,823 | B2 | 3/2004 | Faris et al. |
| 6,912,018 | B2 | 6/2005 | Faris et al. |
| 6,965,420 | B2 | 11/2005 | Li et al. |
| 6,978,070 | B1 | 12/2005 | McCarthy et al. |
| 7,038,745 | B2 | 5/2006 | Weber et al. |
| 7,042,615 | B2 | 5/2006 | Richardson |
| 7,099,062 | B2 | 8/2006 | Azens et al. |
| 7,113,335 | B2 | 9/2006 | Sales |
| 7,166,797 | B1 | 1/2007 | Dziendziel et al. |
| 7,221,827 | B2 | 5/2007 | Domash et al. |
| 7,276,432 | B2 | 10/2007 | McCarthy et al. |
| 7,300,167 | B2 | 11/2007 | Fernando et al. |
| 2002/0079485 | A1 | 6/2002 | Stintz et al. |
| 2002/0085151 | A1 | 7/2002 | Faris et al. |
| 2002/0114367 | A1 | 8/2002 | Stintz et al. |
| 2003/0066998 | A1 | 4/2003 | Lee |
| 2003/0138209 | A1 | 7/2003 | Chan |
| 2005/0221128 | A1 | 10/2005 | Kochergin |
| 2006/0011904 | A1 | 1/2006 | Snyder et al. |
| 2006/0257090 | A1 | 11/2006 | Podolskiy |
| 2008/0061222 | A1 | 3/2008 | Powers et al. |
| 2008/0117500 | A1* | 5/2008 | Narendran et al. ........... 359/326 |
| 2008/0210893 | A1 | 9/2008 | McCarthy et al. |
| 2009/0015902 | A1 | 1/2009 | Powers et al. |
| 2009/0128893 | A1 | 5/2009 | McCarthy et al. |
| 2009/0167971 | A1 | 7/2009 | Powers et al. |
| 2010/0118380 | A1 | 5/2010 | Xue |

FOREIGN PATENT DOCUMENTS

| | | |
|---|---|---|
| JP | 58010717 | 1/1983 |
| JP | 61223719 | 10/1986 |
| KR | 2004-48916 | 4/2003 |
| WO | WO 2006/023195 | 2/2006 |
| WO | WO 2008/092038 | 7/2008 |

OTHER PUBLICATIONS

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Siegel, J. D., "The MSVD Low E 'Premium Performance' Myth," International Glass Review, Issue 1, 2002, pp. 55-58.

Zhang, W., Giant optical activity in dielectric planar metamaterials with two-dimensional chirality, Journal of Optics A: Pure and Applied Optics, 8, pp. 878-890 (2006).

Korean Intellectual Property Office as International Searching Authority, International Search Report and Written Opinion for International Application No. PCT/US2008/051959, Jun. 3, 2008, 10 pages.

Korean Intellectual Property Office as International Searching Authority, International Search Report and Written Opinion for International Application No. PCT/US2008/069881, Sep. 30, 2008, 10 pages.

Korean Intellectual Property Office as International Searching Authority, International Search Report and Written Opinion for International Application No. PCT/US2008/087964, Mar. 31, 2009, 12 pages.

Notice of Allowance, U.S. Appl. No. 12/019,602, dated Jun. 9, 2010.

Hao, J. et al., "Manipulating Electromagnetic Wave Polarizations by Anisotropic Metamaterials," Physical Review Letters, 2007, vol. 99, No. 063908.

Sarychev, et al., "Negative refraction metamaterials," Chapter 8 (Wiley 2005).

Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Korean Intellectual Property Office as International Searching Authority, International Search Report and Written Opinion for International Application No. PCT/US2009/041576, Nov. 25, 2009, 7 pages.

Notice of Allowance, U.S. Appl. No. 12/172,156, dated Mar. 11, 2010.

* cited by examiner

THERMALLY SWITCHED OPTICAL DOWNCONVERTING FILTER

CROSS REFERENCE TO RELATED APPLICATIONS

This application is a divisional of U.S. patent application Ser. No. 12/019,602 filed 24 Jan. 2008 entitled "Thermally switched optical downconverting filter," which claimed the benefit of priority pursuant to 35 U.S.C. §119(e) of U.S. provisional patent application No. 60/897,184 filed 24 Jan. 2007 and U.S. provisional patent application No. 60/931,068 filed 21 May 2007, each of which is hereby incorporated herein by reference in its entirety.

BACKGROUND

1. Technical Field

The subject matter described herein relates to solid-state and "nearly solid state" devices for controlling the flow of light and radiant heat through downconversion and selective reflection. The technology has particular, but not exclusive, application in passive or active temperature-regulating films, materials and devices, especially as construction materials.

2. Description of the Related Art

Photodarkening materials have been used for decades, for example in sunglass lenses, to selectively attenuate incoming light when stimulated by ultraviolet (UV) radiation. When incorporated into windows, such materials can be used to regulate the internal temperature of a structure by darkening to attenuate bright sunlight and by becoming transparent again to allow artificial light or diffuse daylight to pass through unimpeded. Such systems are passive and self-regulating, requiring no external signal other than ambient UV light in order to operate. However, because they are controlled by ultraviolet rather than by temperature, such systems are of limited utility in temperature-regulating applications.

Electrodarkening and photodarkening materials attenuate incoming light primarily through absorption rather than reflection, meaning they will heat up when exposed to bright light. This creates a conductive heat flux which offsets the reductions in radiative transmission and thus places significant limits on their ability to regulate temperature.

The process of absorbing one wavelength of light and emitting another, longer wavelength of light is known as downconversion. This process occurs in a number of naturally occurring fluorescent and phosphorescent materials, including phosphorus. Blackbody radiation from an energy-absorbing material is a form of downconversion as well. Downconversion also occurs in semiconductor materials, which absorb energy over a wide band of wavelengths and emit energy in a much narrower band, centered on the bandgap energy of the material, through a process known as photoluminescence. A downconverter can easily be fashioned from a piece of bulk semiconductor.

The fabrication of very small structures to exploit the quantum mechanical behavior of charge carriers, e.g., electrons or electron "holes" is well established. Quantum confinement of a carrier can be accomplished by a structure having one or more dimensions less than the quantum mechanical wavelength of the carrier. Confinement in a single dimension produces a "quantum well," and confinement in two dimensions produces a "quantum wire."

A quantum dot is a structure capable of confining carriers in all three dimensions. Quantum dots can be formed as particles, with dimensions in all three directions of less than the de Broglie wavelength of a charge carrier. Quantum confinement effects may also be observed in particles of dimensions less than the electron-hole Bohr diameter, the carrier inelastic mean free path, and the ionization diameter, i.e., the diameter at which the quantum confinement energy of the carrier is equal to its thermal-kinetic energy. It is postulated that the strongest confinement may be observed when all of these criteria are met simultaneously. Such particles may be composed of semiconductor materials (for example, Si, GaAs, AlGaAs, InGaAs, InAlAs, InAs, and other materials), or of metals, and may or may not possess an insulative coating. Such particles are referred to in this document as "quantum dot particles."

Quantum dots can have a greatly modified electronic structure from the corresponding bulk material, and therefore different properties. Because of their unique properties, quantum dots are used in a variety of electronic, optical, and electro-optical devices. Quantum dots are currently used as near-monochromatic fluorescent light sources, laser light sources, light detectors including infrared (IR) detectors, and highly miniaturized transistors, including single-electron transistors.

The embedding of metal and semiconductor nanoparticles inside bulk materials (e.g., cadmium sulfide particles as a colorant in ornamental crystal) has been practiced for centuries. However, an understanding of the physics of these materials has only been achieved comparatively recently. These nanoparticles are quantum dots with characteristics determined by their size and composition. These nanoparticles serve as dopants for the material in which they are embedded to alter selected optical or electrical properties. The "artificial atoms" represented by these quantum dots have properties which differ in useful ways from those of natural atoms. However, it must be noted that the doping characteristics of the quantum dots are fixed at the time of manufacture and cannot be adjusted thereafter.

Leatherdale et al., "Photoconductivity in CdSe Quantum Dot Solids," Physics Review B (15 Jul. 2000), describe, in detail, the fabrication of "two- and three-dimensional . . . artificial solids with potentially tunable optical and electrical properties." These solids are composed of colloidal semiconductor nanocrystals deposited on a semiconductor substrate. The result is an ordered, glassy film composed of quantum dot particles, which can be optically stimulated by external light sources or electrically stimulated by electrodes attached to the substrate to alter optical and electrical properties.

U.S. Pat. No. 5,881,200 to Burt discloses an optical fiber (1) containing a central opening (2) filled with a colloidal solution (3) of quantum dots (4) in a support medium. The purpose of the quantum dots is to produce light when optically stimulated, for example, to produce optical amplification or laser radiation. The quantum dots take the place of erbium atoms, which can produce optical amplifiers when used as dopants in an optical fiber. The characteristics of the quantum dots can be influenced by the selection of size and composition at the time of manufacture. Although this device has an input or source path and an output or drain path, it does not have means of external control, and so is not a "switch" in any meaningful sense. As such, it does not prevent or regulate the flow of light energy through the fiber.

Goldhaber-Gordon et al., "Overview of Nanoelectronic Devices," Proceedings of the IBEE, Vol. 85, No. 4, (Apr. 1997), describe what may be the smallest possible single-electron transistor. This consists of a "wire" made of conductive $C_6$ benzene molecules with a "resonant tunneling device," or "RTD," inline that consists of a benzene molecule surrounded by $CH_2$ molecules, which serve as insulators. The device is described, perhaps incorrectly, as a quantum well (rather than a quantum dot) and is intended as a switching device transistor rather than a confinement mechanism for charge carriers. However, in principle the device should be capable of containing a small number of excess electrons and thus serving as a quantum confinement device. Thus, the authors remark that the device may be "much more like a quantum dot than a solid state RTD." (See p. 19.)

U.S. Pat. No. 6,512,242 to Fan et al. describes a device for producing quantum effects comprising a quantum wire (504), energy carried along the quantum wire under voltage control, and quantum dots (502, 503) near the quantum wire that hold energy. The quantum wire transports electrons into and out of a quantum dot or plurality of quantum dots through "resonant tunneling." As described by Fan et al., the quantum dots serve as "resonant coupling elements" that transport electrons along the quantum wire acting as an electronic waveguide or between different ports on the same waveguide. In other words, the quantum dots serve as a kind of conduit.

U.S. patent application publication no. 2002/0079485A1 by Stinz et al. discloses a "quantum dash" device that can be thought of as a non-spherical, non-radially-symmetric quantum dot particle with elongated axes, or as a short, disconnected segment of quantum wire. In this sense, quantum dashes are merely a special class of quantum dot particles. As described by Stinz et al., pluralities of the quantum dash devices are embedded at particular locations inside a solid material to enhance the excitation of laser energy within the material. The resulting structure is a "tunable laser" with an output frequency that can be adjusted over a narrow range. This tuning is accomplished through "wavelength selective feedback" using an external optical grating to limit the input light frequencies that can reach the dashes inside the material. The publication notes that "an ensemble of uniformly sized quantum dashes that functioned as ideal quantum dots would have an atomic-like density of states and optical gain." Stinz et al. relies on the exact geometry and composition of the semiconductor material to produce quantum dashes of a particular size and shape. Therefore, selection of the available quantum states is achieved exclusively at the time of manufacture, "with a variety of length-to-width-to-height ratios, for example, by adjusting the InAs monolayer coverage, growth rate, and temperature." The energy affects all the quantum dashes equally, along with the surrounding material in which they are embedded, and if the surrounding material is opaque, then photon energy cannot reach the quantum dashes at all. Again, this device is not an optical switch.

U.S. Patent Application Publication No. 2002/0114367A1 by Stinz et al. discloses "an idealized quantum dot layer that includes a multiplicity of quantum dots embedded in a quantum well layer sandwiched between barrier layers." Similarly, U.S. Pat. No. 6,294,794 B1 to Yoshimura et al. discloses "a plurality of quantum dots in an active layer such that the quantum dots have a composition or doping modified asymmetric in a direction perpendicular to the active layer." These quantum dot particles are simply embedded in an optical crystal. A similar quantum dot layer structure is disclosed in U.S. Pat. No. 6,281,519 B1 to Sugiyama et al.

McCarthy, et al., in U.S. Pat. No. 6,978,070, discloses in detail a plurality of bank-addressable quantum dot devices which can be used as programmable dopants to alter the bulk electrical, optical, thermal, magnetic, chemical, and mechanical properties of a substrate (whether cylindrical, flat, or some other shape) in a controlled and repeatable way. This control could take place not only at the time of fabrication of the material, but also in real time, i.e., at the time of use, in response to changing needs and conditions.

McCarthy et al, in U.S. Patent Application Publication No. 2006/0011904, discloses a layered composite film incorporating quantum dots as programmable dopants. A means is described in detail for controlling large numbers of quantum dots in order to affect the bulk properties of a substrate near its surface. The device may incorporate switches in order to turn power on and off to control wires or control wire branches, but these switches are not thermally controlled. The authors also note that the device "can . . . be used as a solid-state thermal switch, i.e., it can be switched between thermally conductive and thermally insulating states, forming the thermal equivalent of an electronic transistor or rheostat." However, the configuration of such a thermal switch is not specified, e.g., the input and output paths are not drawn or described, although the source, drain, and gate of the switches (122) in the control wires are clearly shown.

Harrison, "Quantum Wells, Wires, and Dots," John Wiley & Sons, Ltd. (2000) notes the existence of a "two dimensional electron gas field effect transistor (TEGFET) . . . a type of High Electron Mobility Transistor (HEMT) designed to exploit the high in-plane (x-y) mobility which "arises when a . . . heterojunction is modulation-doped." This design includes the one-dimensional quantum confinement of carriers (i.e., confinement along the z-axis) which can occur at a heterojunction (i.e., at the interface between two electrically dissimilar materials). However, since carriers are only free to travel in the x-y plane, and since there is no quantum confinement in the x or y direction, the one-dimensional quantum confinement is incidental rather than exploited, and does not play a necessary role in the functioning of the device. While this device is certainly a switch, it is neither optical in nature nor thermally controlled.

Harrison also discloses an effect known as the Quantum Confined Stark Effect, wherein an electric field is applied perpendicular to a quantum well to affect the energy level of the carriers confined within it. While this is known to have a slight effect on the absorption spectrum of the quantum well, the effect is exploited in sensors rather than in switches. In addition, Harrison does not state or imply that the Stark Effect has ever been used to modify the behavior of a TEGFET device or any other type of switch.

There is one other type of switch that relies on quantum confinement: the single-electron transistor or SET. This consists of a source (input) path leading to a quantum dot particle or quantum dot device, and a drain (output) path exiting, with a gate electrode controlling the dot. With the passage of one electron through the gate path into the device, the switch converts from a conducting or closed state to a nonconducting or open state, or vice-versa. However, SETs are not designed to control the flow of thermal or optical energy and do not incorporate optical downconverters or bandblock filters.

Thermal switches also exist, which allow the passage of heat energy in their ON or closed state, but prevent it in their OFF or open state. However, these switches are mechanical relays, which rely on contact between two conducting surfaces (typically made of metal) to enable the passage of heat. When the two surfaces are withdrawn, heat energy is unable to conduct between them except through the air gap. If the device is placed in vacuum, heat conduction is prevented entirely in the open state. Another type of thermal switch involves pumping a gas or liquid in or out of a chamber. When the chamber is full, it conducts heat. When empty, there is no conduction. Notably, these devices are not solid-state, not multifunctional, not programmable, and do not rely on quantum confinement for their operation.

Optical switches also exist. Light can be blocked by optical filters which absorb or reflect certain frequencies of light while allowing others to pass through. Shortpass and longpass filters may be used or a narrow range of frequencies can be blocked by a notch filter or bandblock filter. Some filters today also incorporate quantum wells, quantum wires, or quantum dot particles.

The addition of a mechanical shutter can turn an otherwise transparent material—including a filter—into an optical switch. When the shutter is open, light passes through easily. When the shutter is closed, no light passes. If the mechanical shutter is replaced with an electrodarkening material such as a liquid crystal, then the switch is "nearly solid state," with no moving parts except photons, electrons, and the liquid crystal molecules themselves. Other electrodarkening materials, described for example in U.S. Pat. No. 7,099,062 to Azens et al., can serve a similar function. It will be clear to a person of ordinary skill in the art that these optical filter/switch combinations are not passive, but must be operated by external signals.

The information included in this Background section of the specification, including any references cited herein and any description or discussion thereof, is included for technical reference purposes only and is not to be regarded as subject matter by which the scope of the invention is to be bound.

SUMMARY

The technology disclosed herein is directed to the separate control over the thermal conductivity and transmissivity of a material with regard to radiant energy for the purpose of regulating the flow of heat in useful ways, without necessarily retaining the optical characteristics of the radiant energy passing through the material. In particular implementations the technology employs a temperature-responsive optical downconverter, sandwiched between two notch or bandblock filters of different center wavelength or placed adjacent to a single object, to regulate the passage of light energy such that most of the incident energy passes through the device when it is below a threshold temperature, and such that most of the incident energy is reflected, or absorbed and re-radiated, or otherwise directed away from the device above a second threshold temperature, yielding a thermally switched optical downconverting filter (hereinafter a "TSOD filter").

The TSOD filter exhibits three distinct behaviors. At a low temperature range or below a threshold temperature, light energy passes through the TSOD filter. Over an intermediate temperature range, the TSOD filter reflects or radiates away approximately half of the light energy that strikes it, and transmits the other half. Over a high temperature range or above a threshold temperature, the TSOD filter reflects or radiates away almost all of the incident light energy. Thus, the TSOD filter can be used to regulate the internal temperatures of buildings and other structures by controlling the amount of solar radiation they absorb.

The TSOD filter is a passive, self-regulating device—a so-called smart material—which requires no external signals or user inputs in order to function. The TSOD filter thus functions as a solid-state optical switch. The switch contains no moving parts, other than photons and electrons. The TSOD filter further provides for regulation, based on temperature, of the amount of light energy that passes through it. This permits control over the internal temperatures of buildings, vehicles, and other structures by controlling the absorption of solar energy or other incident light energy.

The physical instantiation of the TSOD filter may be thick or thin, strong or weak, rigid or flexible, monolithic or made up of separate parts, without altering its basic function in any significant way. When the TSOD filter is configured to transmit little or no visible light, it may serve as an aesthetic, energy-regulating replacement for opaque building materials such as wood, brick, fiberglass, and drywall. When the TSOD filter is configured to transmit diffuse or attenuated visible light, it may serve as an aesthetic, energy-regulating replacement for translucent building materials such as glass block, privacy glass, and textured polymers. When the TSOD filter is configured to transmit visible light with little diffusion or attenuation, it may serve as an aesthetic, energy-regulating replacement for transparent building materials such as glass or polymer windows. When the downconverter in the TSOD filter is configured to emit monochromatic light in the visible spectrum, it may serve as a bright, energy-regulating replacement for stained glass, tinted windows, window appliques and coatings, or colored artificial light sources.

In one implementation, the invention may take the form of a window having a pane of glass, a low emissivity coating on a surface of the glass pane, and a thermochromic downconverter film supported by the glass pane. The thermochromic downconverter film absorbs incident light of a broad bandwidth and emits light at an emission wavelength substantially or entirely longer than wavelengths of the broad bandwidth. The emission wavelength is variable depending upon a temperature of the downconverter layer. The first low emissivity coating blocks the emitted light when a temperature of the window is in a first range and passes the emitted light when the temperature of the window is in a second range.

In another implementation, the invention may be seen in a method for regulating the flow of light and radiant heat. Incident light of multiple wavelengths is absorbed with a downconverter. The incident light is emitted from the downconverter at an emission wavelength substantially or entirely longer than the wavelengths of the incident light. The emitted light is reflected by one or more bandblock filters. The emitted light escapes in an inward direction when an ambient temperature is within a first range. The emitted light escapes in an outward direction when the ambient temperature is within a second range. The emitted light escapes in both the inward direction and the outward direction when the ambient temperature is between the first range and the second range.

In a further implementation, the invention may again be seen in a method for regulating the temperature of a building. An exterior surface of at least a portion of the building is clad with a layered material comprising a downconverter layer and one or more bandblock filters. Incident light is absorbed at multiple wavelengths within the downconverter layer. The incident light is emitted from the downconverter layer at an infrared wavelength. The emitted light is reflected with one or more bandblock filters. The emitted light escapes in an inward direction when an ambient temperature is below a first threshold temperature. The emitted light escapes in an outward direction when the ambient temperature is above a second threshold temperature. The emitted light escapes in both the inward direction and the outward direction when the ambient temperature is between the first threshold temperature and the second threshold temperature.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

Please note that closely related elements have the same element numbers in all figures.

DETAILED DESCRIPTION

Figure 1:
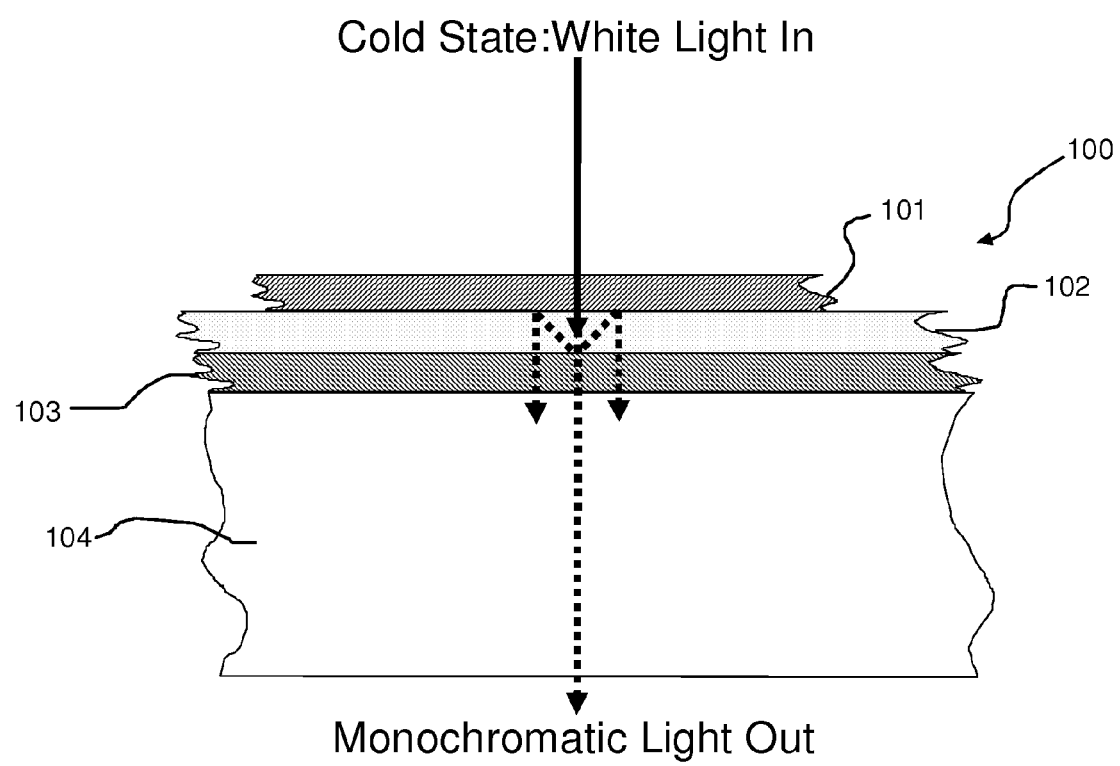
FIG. 1 is a schematic, cross-section representation of one embodiment of a TSOD filter depicting a layer of downconverter material sandwiched between two bandblock filters and attached to a transparent substrate. The action of incoming light is depicted for the cold state of the TSOD filter.

The disclosed technology is directed to the use of a thermochromic optical downconverter, in conjunction with one or more bandblock filters, to create a thermally switched optical downconverting filter (TSOD filter) that allows light energy to pass through at low ambient temperatures and reflects or radiates it away at high ambient temperatures. The technology is well suited for use in building materials such as spandrels, windows, and siding to passively regulate the heating and cooling of a building or other structure. For example, in the winter when the ambient air temperature is cold, building materials incorporating a TSOD filter can pass the majority of the solar energy from incident sunlight into the interior of the building to passively heat the building. Likewise, in the summer when the ambient air temperature is hot, building materials incorporating a TSOD filter can block the majority of the solar energy from incident sunlight from passing into the interior of the building and thus keep the building cool.

For the purposes of this document, the term "switch" includes solid-state, chemical, and mechanical devices for selectively blocking or permitting the flow of energy, and includes both digital switches (e.g., transistors and relays) and analog regulators (e.g., tubes and rheostats). Furthermore, a valve for selectively blocking or regulating the flow of gases or fluids can be considered analogous to a switch, so that in principle the two terms can be used interchangeably. By this definition, the TSOD filter is a solid-state optical switch, which moves from its "open" or transmissive state to its "closed" or reflective/radiation-blocking state based on the temperature of the device.

For the purposes of this document, the term "passive" refers to an object or device which responds to environmental conditions but operates independently of external signals or instructions from an operator. Thus, a device may include a number of complex components—even moving parts—and still be regarded as "passive" for the purposes of this document. Similarly, the possible existence of a user override mode does not alter, in any essential way, the passive nature of such a device. By contrast, an active device is one that requires user input in order to perform its normal functions. (By these definitions, light-sensitive sunglasses are a passive device, whereas a standard light bulb operated by a wall switch is an active device.)

The TSOD filter includes a downconverter, which absorbs incoming light (e.g., sunlight) at a variety of wavelengths over a large portion of the spectrum (generally including visible light, near ultraviolet, and near infrared), and fluoresces or photoluminesces such that it emits light in a different range of wavelengths (generally infrared, although other wavelengths may be used instead), at a lower energy (i.e., lower frequency or longer wavelength) than that of the absorbed light. Many bulk materials such as phosphorus are well known to fluoresce or photoluminescence in this way. Semiconductors are particularly known for emitting light at their bandgap energy. Quantum confinement structures such as quantum wells, quantum wires, quantum dashes, and quantum dots may also be used as downconverters. Quantum confinement structures tend to have much higher efficiencies than semiconductors, i.e., they re-emit a larger percentage of the energy they absorb.

Blackbody radiators may also be used as downconverters. Blackbody radiators do not fluoresce, but they do absorb radiation (e.g., visible light) and re-emit it at longer wavelengths (e.g., infrared). An exemplary form of a blackbody radiator may be as simple as a piece of steel or other metal possibly painted black to ensure broadband absorption. Other exemplary blackbody radiators that may be used in a TSOD filter may include dark-colored polymers and ceramics, honeycombs and other aerospace-derived "precision blackbody" type structures, or even a simple coating of dark (ideally black) paint.

The downconverter may also be selected or designed to be "thermochromic." In other words, the emission peak of the material shifts with temperature. Many materials are known to have this property. Blackbody radiators shift their peak output wavelength according to Wein's law. Semiconductor materials change their emission wavelength or "color" because temperature affects their interatomic spacing or lattice constant and thus alters their effective bandgap. However, the effective bandgap of quantum confinement structures (typically quantum wells, quantum wires, and quantum dots) is an inverse function of their size as well as being a function of their composition and lattice constant. Thus, these structures are also thermochromic to some extent.

Another component of the TSOD filter is a notch filter or bandblock filter, which is highly reflective to light in a particular range of wavelengths, and highly transparent to other wavelengths within the spectrum of concern (typically near- UV, visible (VIS), and near-IR light). Examples of UV/VIS/NIR bandblock filters include the distributed Bragg reflector (DBR), which uses alternating layers of two transparent materials with different indices of refraction, and a rugate filter, which relies on a smoothly varying index of refraction from one face of the material to the other. Low emissivity coatings or films, for example, coatings of indium tin oxide or other metal oxides may also function as bandblock filters. As used herein, the terms "coating" and "film" may be used interchangeably and each is intended to encompass the other when applicable in any particular implementation. Sheets of ordinary glass or glass including borosilicate and many other types of bandblock filters also exist which could be used in the TSOD filter with equal effectiveness, and which need not be elaborated here in order to fully convey the possible implementations of the design, functions, and utility of the TSOD filter. Because the bandblock filter is transparent to light outside of its stop band or stop bands, most of the incident light (e.g., sunlight) striking the TSOD filter passes directly through the bandblock filter with very little attenuation or reflection. Optical, infrared, and ultraviolet bandblock filters are well known in the prior art, and need no elaboration here.

Many embodiments of the TSOD filter also include a thermochromic filter or attenuator, which is defined as any material, object, device, or mechanism whose transmissivity to incoming radiation (e.g., visible light) varies with temperature. For example, a thermotropic liquid crystal, paired with a polarizer on each surface, may be used as an attenuator. This structure is generally transparent, but turns black (absorptive) above a threshold temperature, known as the clearing point, or in the presence of an electric field.

In many implementations the downconverter in its cold state absorbs white light passing through the bandblock filter and emits monochromatic light (e.g., near-infrared light at a wavelength of 2000 nm). This light is emitted by the downconverter layer in all directions, but the vast majority of this emission is basically normal or perpendicular to the TSOD filter. Fifty percent of this light passes inward and the other 50% passes outward. However, if the emission peak wavelength of the downconverter falls within the stop band of the bandblock filter, this light is reflected back through the downconverter again. Thus, the white light passing through the TSOD filter is converted to lower-frequency/longer-wavelength light, which is prevented from escaping back out the way it came in. This light then passes through a second bandblock filter, whose stop band has been selected such that the monochromatic light passes through it unattenuated in the cold state.

However, when the downconverter is above a threshold temperature, its emission peak shifts such that it falls outside the stop bands of both bandblock filters. In this case, since neither filter reflects the monochromatic light, half of the emissions of the downconverter radiate into the device and the other half radiate out. Thus, the total energy transmitted by the device is half what it was in the cold state.

Finally, when the downconverter is above a second threshold temperature, its emission peak falls outside the stop band of the outer bandblock filter, and inside the stop band of the inner bandblock filter. In this case, the monochromatic light which radiates out of the device is permitted to leave, whereas the monochromatic light radiating into the device is reflected back out again. Thus, very little of the incident light energy striking the device is allowed to pass through it. Instead, it is converted to monochromatic light and then reflected away.

As a result, the TSOD filter exhibits three distinct behaviors: at low temperature it passes light energy through. At intermediate temperature it reflects or radiates away approximately half of the light energy that strikes it, and transmits the other half. At high temperature, it reflects or radiates almost all of the incident light energy. Thus, the TSOD filter can be used to regulate the internal temperatures of buildings and other structures by controlling the amount of solar radiation they absorb.

The TSOD filter has particular, but not exclusive, application in regulating the temperatures of buildings by controlling the amount of solar radiation they absorb. In addition, it is possible to enhance the performance of the TSOD filter by improving its cold-state light absorption or hot-state light rejection, or by decreasing its thermal conductivity. Furthermore, it is possible to increase the transparency of the TSOD filter by adjusting the thickness, optical density, or arrangement of the downconverter layer (e.g., by alternating stripes or spots of downconverter material with transparent material). Thus, the TSOD filter may be functionally enhanced for certain applications through the addition of optional features such as fins, collimators, diffusers, attenuators, anti-reflection coatings, concentrating lenses, air gaps or vacuum gaps, or translucent thermal insulators including, but not limited to, foamed glass and silica aerogels.

Although the materials and structures of the TSOD filter may be rigid, there is no requirement for rigidity in order for it to perform the functions described herein. Furthermore, while the various components of the TSOD filter are shown and described as being attached or in direct physical contact, the TSOD filter will also function if the components are merely adjacent but physically separate. Thus, while the TSOD filter may be embodied as a solid object (e.g., a brick, spandrel, or movable panel) or group of solid objects (e.g., components affixed to an optical workbench), it can also be embodied as a flexible object such as, for example, a tent material, blanket, curtain, or an appliqué film which can be applied to the surface of glass windows, spandrels, or glass block building materials.

Although the maximum control over energy transport for the TSOD filter occurs when the output wavelength of the downconverter is as large as possible, the output wavelength can be selected to occur within the visible spectrum for aesthetic reasons, or as a source of useful light. The output wavelength of the downconverter can further be chosen to provide an emission wavelength for optimal catalysis of chemical or biochemical reactions. For example, the emission wavelength could be optimized to promote photosynthesis or sun tanning, or to produce particular optical effects such as the excitation of a crystal, as in a laser. Because of the photoluminescent properties of the downconverter, the output of colored light from the TSOD filter is significantly brighter than can be achieved by simply passing white light through a colored filter. In addition, it is possible to add a reflective "color" to the surface of the device, with minimal effect on its efficiency, by adding one or more additional bandblock filters to reflect particular wavelengths of light. The resulting optical properties do not closely resemble those of any other building material.

FIG. 1 is a schematic, cross-section view of one embodiment of the TSOD filter 100 depicting a downconverter layer 102 sandwiched between two bandblock filters 101 and 103, and attached to a transparent substrate 104. In the most general case the external light source will be white light, i.e., light with significant intensity across a significant bandwidth of the visible, near-UV and near-IR spectrum. In one exemplary use of the TSOD filter 100, the external light source is the sun. However, the TSOD filter 100 will also function when the external light source is not white, as for example the diffuse radiant energy of the blue sky.

Incoming light first passes through the outer bandblock filter 101. In one embodiment, the bandblock filter has an extremely narrow stop band (bandwidth of 100 nm or less) in the infrared portion of the spectrum (i.e., wavelengths of 750 nm or greater). Exemplary forms of the bandblock filter 101 include a distributed Bragg reflector (DBR) or rugate filter. Both types of reflectors can be made from a variety of materials. In exemplary implementations, the bandblock filter 101 may be a DBR composed of alternating layers of two different transparent polymers, such as polystyrene (PS) and polymethyl methacrylate (PMMA). A person skilled in the art will understand that these layers can be formed by a variety of standard deposition techniques which need not be elaborated here. However, in exemplary implementations these layers may be formed by spin-coating layers onto a substrate with liquids consisting of a single polymer dissolved in a solvent.

The portion of the incoming spectrum that falls within the stop band is reflected away by the bandblock filter 101. However, the bandwidth and center wavelength of the stop band will generally be selected such that these reflective losses are minimized. For example, only 2% of the sea-level solar spectrum occurs between the wavelengths of 2000 and 2200 nm. Thus, a bandblock filter that reflected light in this range would nevertheless transmit up to 98% of incoming sunlight.

Once it has passed through the outer bandblock filter 101, the incoming light (e.g., sunlight) enters the downconverter 102, which is a device or material that absorbs high-energy light at a variety of wavelengths and re-emits the light in a single, narrow band of wavelengths which are always equal to or longer than the wavelengths absorbed. For example, an exemplary downconverter 102 with an emission peak at 2000 nm would absorb light with a wavelength shorter than this, and re-emit the energy in a narrow, Gaussian band centered around 2000 nm. In general, the downconverter 102 will be transparent to wavelengths longer than its emission peak, so that when exposed to sunlight passing through the outer bandblock filter 101, the exemplary downconverter 102 would allow incoming radiation with a wavelength greater than 2000 nm—approximately 7% of the total energy—to pass through unattenuated.

A variety of devices and materials exhibit this behavior, including blackbodies which absorb and thermally re-radiate, and bulk semiconductors whose emission peak occurs at their bandgap energy. However, quantum confinement structures such as quantum wells, quantum wires, and quantum dots generally have higher optical efficiencies than bulk semiconductors, so that a majority of incoming light is absorbed and converted, with only a small portion reflected away, transmitted through, or dissipated as waste heat. In some implementations, the downconverter 102 consists of a plurality of quantum dot particles embedded in a transparent polymer. However, the downconverter could also be a quantum well, an arrangement of quantum wires, a bulk material such as a semiconductor, a doped or structured photonic material, or a blackbody absorber/radiator.

The structure, composition, manufacture, and function of quantum dot particles generally is taught in U.S. Patent Application Publication No. 2003/0066998 by Lee et al., which is hereby incorporated by reference as though fully set forth herein. The structure, composition, manufacture, and function of exemplary quantum dot devices are taught in U.S. Pat. No. 5,889,288 to Futatsugi, which is hereby incorporated by reference as though fully set forth herein. The structure, composition, and manufacture of addressable quantum dot arrays are taught in U.S. Pat. No. 6,978,070 to McCarthy et al., which is hereby incorporated by reference as though fully set forth herein. It will be understood by a person of ordinary skill in the art that any quantum confinement structures or devices employed in the TSOD filter as a downconverter may be of different design than those described by Lee et al., Futatsugi, and McCarthy et al., while still performing the essential function of optical downconversion.

The action of incoming light is depicted in FIG. 1 for the cold state of the TSOD filter 100. The downconverter 102 absorbs incoming light and re-emits at a wavelength which is inside the stop band of the outer bandblock filter 101. Thus, any light emitted by the downconverter 102 in the outward direction is reflected back into the device. However, in the cold state the output wavelength of the downconverter 102 is outside the stop band of the inner bandblock filter 103. Thus, any light emitted by the downconverter in the inward direction is passed into and through the transparent substrate 104.

Figure 2:
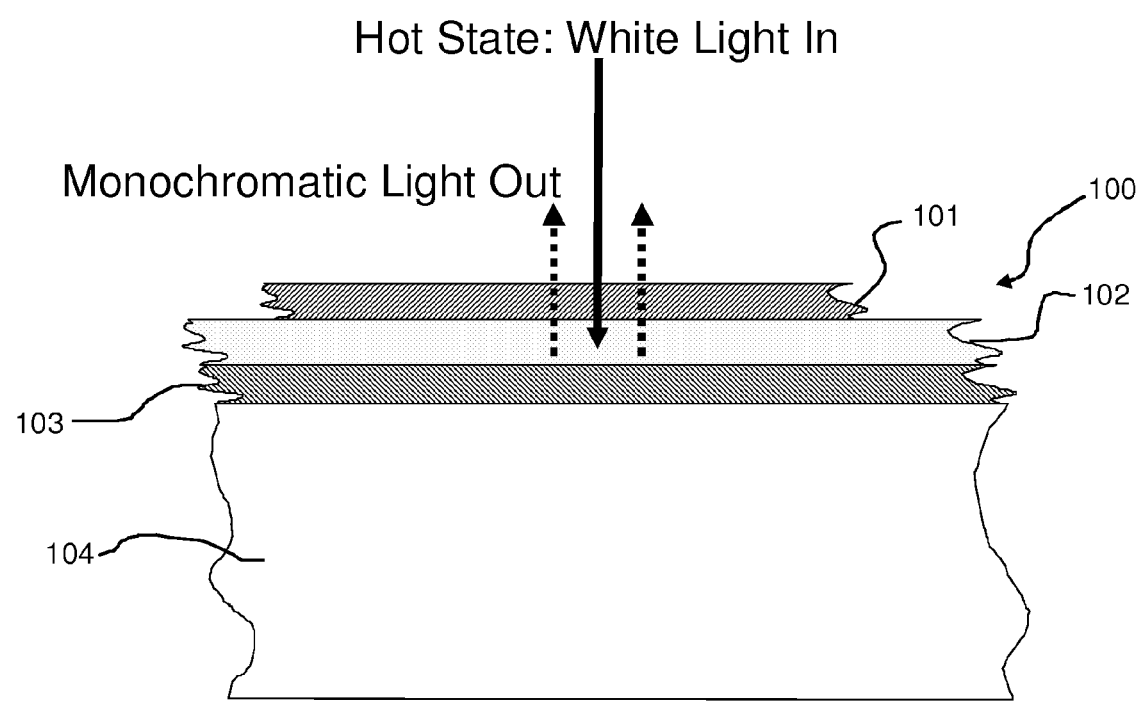
FIG. 2 is a schematic, cross-section representation of the embodiment of FIG. 1, except that the action of incoming light is depicted for the hot state of the TSOD filter.

FIG. 2 is a schematic, cross-section view of the embodiment of FIG. 1, except that the action of incoming light is depicted for the hot state of the TSOD filter 100. The downconverter 102 absorbs incoming light and re-emits at a wavelength which is outside the stop band of the outer bandblock filter 101. Thus, any light emitted by the downconverter 102 in the outward direction is allowed to escape. However, in the hot state the output wavelength of the downconverter 102 is inside the stop band of the inner bandblock filter 103. Thus, any light emitted by the downconverter 102 in the inward direction is reflected back, and does not reach or pass through the transparent substrate 104.

Thus, in its cold state the TSOD filter 100 transmits most of the light energy which strikes its outer surface, re-emitting it as longer-wavelength light (e.g., infrared light) through the inner surface, whereas in the hot state the TSOD filter 100 re-emits this energy back through the outer surface, effectively rejecting it or reflecting it away. As a result, the TSOD filter 100 can be used to regulate the flow of light or radiant heat into a structure based on the temperature of the TSOD filter 100.

From the above description, a person of ordinary skill in the art will realize that in this embodiment, the transparent substrate 104 is present only for reasons of structural support and convenience. This component may be deleted without significantly altering the function of the TSOD filter 100. Alternatively, the transparent substrate 104 could be placed on the outer surface of the TSOD filter 100 rather than the inner surface, or transparent substrates 104 could be placed on both surfaces, or even inserted between one or more of the functional layers of the TSOD filter 100, without significantly altering its function. Furthermore, if the transparent substrate 104 is located on the inside surface of the device as shown in FIGS. 1 and 2, it need not be transparent to all wavelengths, and can in fact be a longpass, shortpass, or bandpass filter as long as the output wavelength of the downconverter 102 falls within the passband of the substrate 104. In other words, the substrate 104 need only be transparent to the wavelengths emitted by the downconverter 104 in its cold state. However, for convenience and cost it will generally be simpler to use an ordinary transparent material such as glass or acrylic as the substrate 104.

Figure 3:
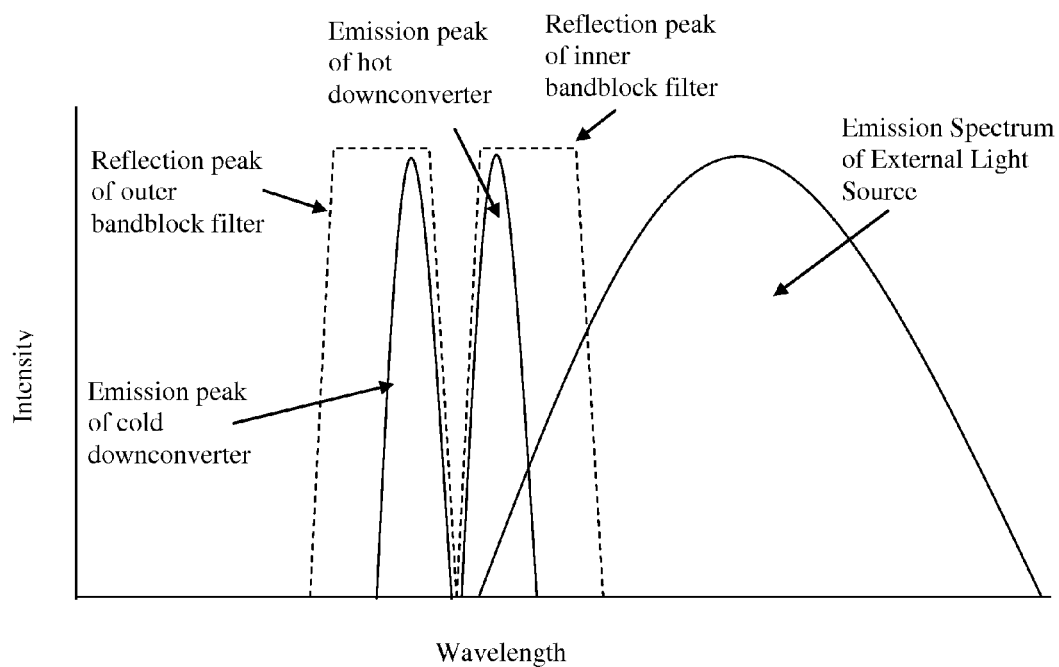
FIG. 3 is a diagram of light intensity vs. wavelength depicting the emission spectrum of the external light source, the fluorescence spectrum or photoluminescence spectrum of the downconverter in cold and hot states, and the reflection spectrum of the two bandblock filters for one implementation of a TSOD filter.

FIG. 3 is a diagram of light intensity vs. wavelength depicting the emission spectrum of the external light source, the fluorescence spectrum or photoluminescence spectrum of the downconverter 102 in cold and hot states, and the reflection spectrum of the two bandblock filters 101 and 103 of an implementation of a TSOD filter 100. As the temperature of the TSOD filter 100 varies, the emission peak of the downconverter 102 moves back and forth, falling within the reflection band of the outer bandblock filter 101 at low temperature, and within the reflection band of the inner bandblock filter 103 at high temperature. At intermediate temperatures the emission band may fall outside the reflection bands of both filters 101, 103. However, under no circumstances does it fall within the reflection bands of both filters. Thus, depending on the temperature of the TSOD filter 100 the light emitted by the downconverter 102 is either reflected inside, reflected outside, or radiated equally in both directions.

Although for convenience the inner filter 103 is described as a bandblock filter, it can be replaced with a longpass filter whose stop band has the same upper cutoff wavelength as the equivalent bandblock filter, but whose lower cutoff wavelength extends, in principle, all the way to zero. This will not affect the essential functioning of the TSOD filter 100, although it will prevent the TSOD filter 100 from transmitting wavelengths too long to be absorbed by the downconverter 102.

Also, it is possible to design an embodiment of the TSOD filter 100 wherein the downconverter 102 is not thermochromic, i.e., it exhibits a single emission peak for all temperatures. In this case, the outer bandblock filter 101 and inner bandblock filter 103 must be thermochromic instead. This will occur, for example, in a distributed Bragg reflector made from materials with a very high coefficient of thermal expansion. Such effects may be difficult to harness except over very large temperature ranges, but such an embodiment may be appropriate for certain applications.

Figure 4:
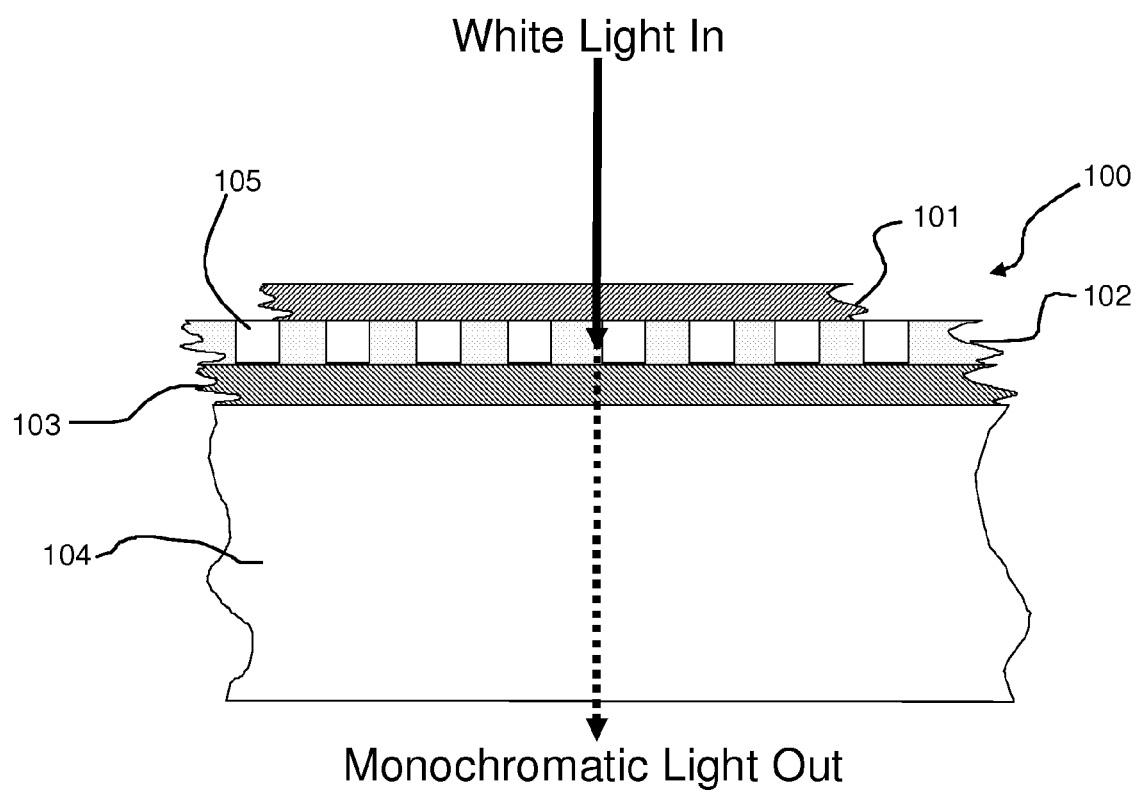
FIG. 4 is a schematic, cross-section representation of another embodiment of the TSOD filter, in which there are holes in the downconverter to allow some white light from the external source to pass through the TSOD filter without modification.

FIG. 4 is a schematic, cross-section representation of another embodiment of the TSOD filter 100, in which there are gaps 105 in the downconverter 102 to allow some white light from the external source to pass through the TSOD filter 100 without modification. These gaps 105 may take the form of holes or stripes, or alternatively the downconverter material itself may be applied in stripes or spots. It should be noted that if the downconverter 102 consists of a liquid or particulate material (e.g., a plurality of quantum dots suspended in a transparent polymer), this material could be dissolved into a solvent and "painted on" through a stencil punched with a plurality of holes. Then, as with any other paint, the solvent would be allowed to evaporate, leaving behind the downconverter material in a pattern of spots, or any other pattern the stencil might hold. However, a person of ordinary skill in the art will understand that there are numerous alternate methods for fashioning the gaps 105 that need not be elaborated here. This embodiment may be useful, for example, in windows which are required to offer a relatively clear view from inside to outside. In this case, the attenuation or obstruction of the downconverter 102 would be similar to looking through a normal window screen.

The use of a downconverter 102 with gaps 105 in place of a uniform downconverter increases the transmission of energy through the TSOD filter 100 under all conditions, and thus reduces the ability of the TSOD filter 100 to reject radiant heat in its hot state. However, this arrangement may be advantageous under circumstances where cold-state performance is more important than hot-state performance.

Figure 5:
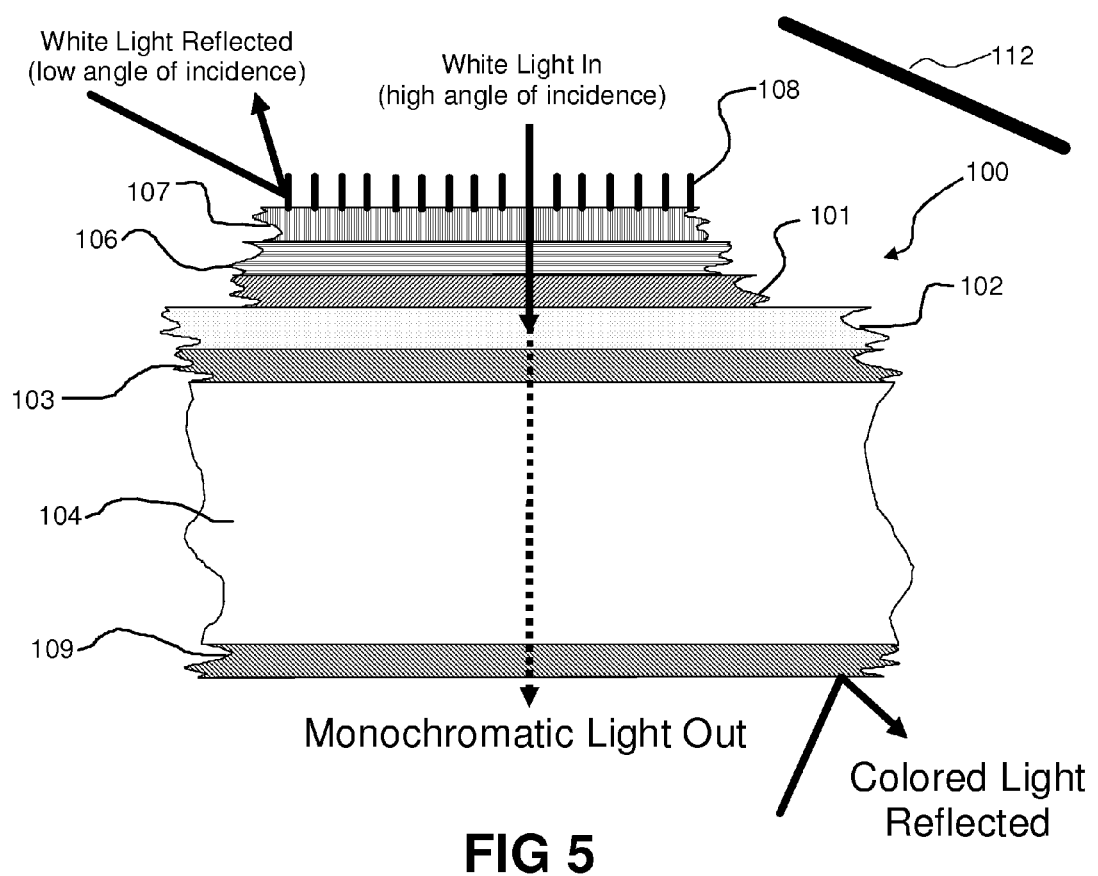
FIG. 5 is a schematic, cross-section representation of an additional embodiment of a TSOD filter in which a number of optional components have been added in order to improve the performance and aesthetics of the device.

FIG. 5 is a schematic, cross-section representation of an additional embodiment of the TSOD filter 100 in which a number of optional components have been added in order to improve the performance and aesthetics of the device. The functioning of the outer bandblock filter 101, downconverter 102, inner bandblock filter 103, and transparent substrate 104 is identical to that described for FIGS. 1 and 2. However, each of the optional components serves a new function which affects the performance and/or aesthetics of the overall device. These optional components all operate independently of one another, i.e., none of them depend on any other optional component in order to perform its function. For convenience, this embodiment will be described as shown in FIG. 5 with all of the optional components in place simultaneously, but a reader of ordinary skill will understand that with some optional components present and some not, the possible permutations are extremely numerous and need not be discussed individually.

Before light enters the outer bandblock filter 101, it first passes through a set of fins 108. In the simplest embodiment, these fins 108 are parallel, horizontal strips of an opaque, reflective, or translucent material that allow incoming light to pass through unaffected when incident at an angle which is perpendicular or nearly perpendicular to the surface of the TSOD filter 100, but restrict, block, absorb, reflect, or attenuate light which is incident at an angle closer to parallel to the surface of the device. In the case where the incoming light is sunlight and the TSOD filter 100 is oriented vertically (e.g., as part of a wall or window), this arrangement will allow more light to enter when the sun is low in the sky (e.g., during the winter), and allow less light to enter when the sun is high (e.g., in the summer). Thus, the TSOD filter 100 has an improved ability to exclude radiant heat from outside in hot weather. A person of ordinary skill in the art will understand that these fins could assume a variety of other forms without altering their essential function. They could be of different shape than shown here, including opaque wedges and cylinders, or transparent lenses of a variety of shapes. Alternatively, a diffraction grating, Fresnel lens, or other optics attached to or embossed on the surface of the TSOD filter 100 could be used to bend incoming light such that only photons entering the device at particular angles are permitted to reach the downconverter 102.

After passing through the fins 108, the incoming light next enters a collimator 107. The purpose of the collimator 107 is to "straighten" the incoming light so that it is all traveling perpendicular to the layers of the TSOD filter 100 while it remains within the collimator 107. For downconverters 102 or bandblock filters 101, 103 which incorporate periodic crystal-like arrangements of microscopic grains, cells, particles, or layers, the incidence angle may have a significant effect on optical properties, and the addition of a collimator 107 can help to reduce such effects where they are not wanted. Exemplary forms of a collimator 107 may include an arrangement of hollow cylinders, fused fiber optics, or the mineral ulexite (also known as "TV stone"), although other forms also exist.

After passing through the collimator 107, the incoming light enters an attenuator 106. The simplest form of attenuator 106 is a neutral-density filter that blocks a percentage of the incoming light at all wavelengths, thus reducing the intensity of the light without significantly affecting its spectrum. The addition of such an attenuator 106 will reduce the transmission of light energy through the TSOD filter 100 in all temperature states, thus limiting the ability of the TSOD filter 100 to direct radiant heat in the cold state. This may be advantageous in applications where hot-state performance is more important than cold-state performance. The skilled reader will note that for some applications it may be advantageous to place other components, such as the attenuator 106 or downconverter 102 internal to the collimator 107, although it is not shown this way in FIG. 5.

Alternatively, in other applications it may be more favorable to use an attenuator 106 with non-neutral density, i.e., a color filter. For example, a shortpass filter could be used to reflect away wavelengths of light too long to be absorbed and reradiated by the downconverter 102, since these wavelengths cannot be controlled by the temperature-based switching of the TSOD filter 100. The attenuator 106 may also be a bandblock filter such as a distributed Bragg reflector or rugate filter which reflects light within a narrow range of wavelengths. This will slightly decrease the amount of energy available to the downconverter 102, which may be advantageous for certain applications, and it will also provide a reflective "color" for the outside surface of the TSOD filter 100, which may serve an aesthetic purpose where the color falls within the visible spectrum.

In still other circumstances, the attenuator 106 may be a photodarkening, photochromic, electrodarkening, or electrochromic material or device, plus supporting hardware that may be required to operate it (e.g., a photovoltaic cell, a temperature sensor, and a control circuit to lighten and darken an electrolyte-based electrochromic filter). The attenuator 106 may even be a mechanical attenuator such as a shutter, a curtain, or a set of louvers, plus any sensors, power sources, and control systems required to operate it (e.g., a temperature-sensitive bimetallic coil such as those found in certain types of thermometers). It is also possible to include multiple attenuators of various types within the same TSOD filter 100.

In one embodiment the attenuator 106 may be a thermochromic or thermodarkening material with transmission, absorption, and/or reflection spectrums that are a function of temperature. Exemplary forms of thermochromic material include zinc oxide (which changes from clear to yellow when heated and reflects light), liquid crystals (which can be formulated to absorb or reflect a percentage of the incident visible light above a given threshold temperature), and tungsten-doped vanadium oxides (which reflects light above a threshold temperature, determined in part by the percentage of tungsten in the composition of the material).

Once the incoming light has been downconverted to monochromatic light in the downconverter 102, and has passed through the inner bandblock filter 103 and transparent substrate 104, the light then passes through a color filter 109 whose purpose is to provide a reflective color to the interior surface of the TSOD filter 100 for aesthetic purposes. In one form, the color filter 109 may be a bandblock filter with a stop band that falls within the visible spectrum. However, the color filter 109 may also be a longpass, shortpass, or bandpass filter, or stacked (i.e., additive) combination of filters. As long as the stop band or stop bands of the color filter 109 do not include the output wavelengths of the downconverter 102, the functioning of the TSOD filter 100 will not be affected, and the ability of the device to transmit energy in its cold state or reject energy in its hot state will not be reduced.

Another optional component is an external reflector 112 to increase the light-gathering area of the TSOD filter 100, in the same way that a telescope mirror increases the light-gathering area of the objective. The external reflector 112 could take virtually any shape and hold a variety of external positions too numerous for elaboration here. The simplest exemplary form of the external reflector 112 is an ordinary mirror placed on the ground, reflecting light up into the TSOD filter 100. Such a component is arguably an external enhancement or adjunct to the TSOD filter 100 rather than a component of the device itself, but some embodiments could include such a reflector 112 as an integral component of the TSOD filter 100.

Another optional enhancement, not pictured in FIG. 5, is to apply antireflection coatings to the surfaces of any or all of the components in the TSOD filter—most particularly those exposed to outside air or to internal air gaps, gas gaps (e.g., argon or krypton filled gaps), or vacuum gaps, or other interfaces where the refractive index of one material is significantly different from the refractive index of its neighbor. The use of the term "air gap" herein is meant to include air gaps, gas gaps, and vacuum gaps collectively and should be interpreted as such unless explicitly stated otherwise. In general, such coatings are microscopically thin, and vary widely in composition depending on the exact application and on the refractive indices of the two materials being matched. This technique is well described in the prior art and need not be elaborated here.

Figure 6:
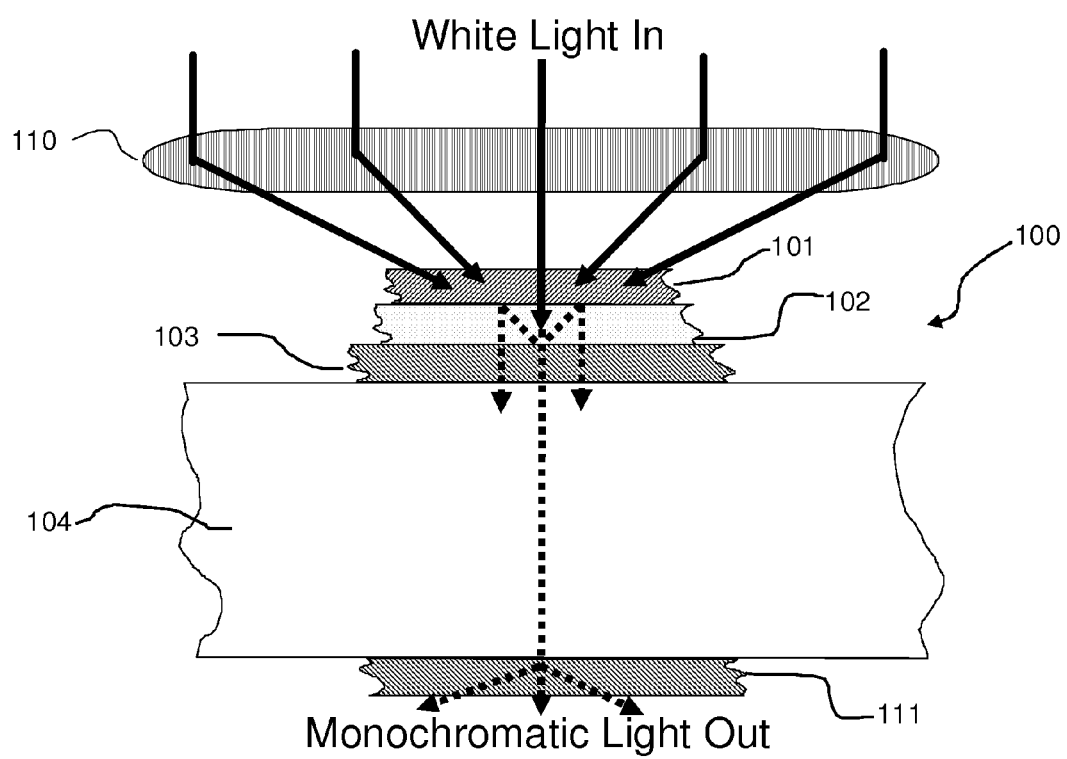
FIG. 6 is a schematic, cross-section representation of a further embodiment of the TSOD filter in which the white light from the external light source is passed through a concentrating lens before striking the downconverter.

FIG. 6 is a schematic representation of a further embodiment of the TSOD filter 100, in which the white light from the external light source is passed through a concentrating lens 110 before striking the outer bandblock filter 101 and downconverter 102. The purpose of the concentrating lens 110 is to project the incoming light from a large area of lens onto a small area of bandblock filter 101 and downconverter 102, either to increase optical efficiency by locally increasing the intensity of the light, or to decrease material requirements by allowing smaller bandblock filters 101, 103 and downconverter 102. This lens 110 could assume a variety of forms—from standard concave and convex designs to spherical, conical, cylindrical, or other shapes designed to concentrate the light in different ways, or on different regions, or to different extents, and could be a complex series of lenses, as in a camera or telescope.

Because concentrated light (e.g., concentrated sunlight) is often a fire hazard or injury hazard, this embodiment may also include a diffuser or de-concentrating lens 111 to prevent light from exiting the TSOD filter 100 in a concentrated beam. Like the concentrating lens 110, the diffuser 111 could assume a variety of forms, although these are less limited than the possible forms of the concentrating lens since de-concentrating or diffusing light is a less demanding application. However, if the diffuser 111 is not included, the TSOD filter 100 has applications as an infrared beam generator, similar in some respects to a laser (though not coherent), which could be used for example in switchable cooking and heating devices such as water heaters that operate over a modest distance.

A reader of ordinary skill will note that the TSOD filter 100 in any of the aforementioned embodiments could function in a degraded capacity with one of its bandblock filters deleted. With the outer bandblock filter 101 missing, the TSOD filter 100 would still function normally in its hot and intermediate states, but would not capture energy as effectively in its cold state. That is, the cold state would behave the same as the intermediate state, capturing approximately half the incident energy and radiating the rest of it back outside. Such an embodiment might be easier or less expensive to build and deploy in hot climates, where cold-state performance is not a significant issue.

With the outer bandblock filter 101 present but the inner bandblock filter 103 missing, the TSOD filter 100 would function normally in the cold and intermediate states, but would not reject light energy as effectively in its hot state. In other words, the hot state would behave the same as the intermediate state, radiating away about half the incident energy, while allowing the other half to pass through the device. Such an embodiment might be easier or less expensive to build and deploy in cold climates, where hot-state performance is not a significant issue. In both cases, the switchability of the device can be improved when a thermochromic attenuator 106 is included as part of the TSOD filter 100.

In an exemplary embodiment, the concentrating lens 110 and de-concentrating lens 111 may be made of a clear, flat polymer such as PMMA, etched with a Fresnel pattern, while the bandblock filters 101, 103, and 109 may be DBRs composed of multiple layers of transparent polymers (e.g., PS and PMMA), and the downconverter 102 may be made of semiconductor quantum dot particles (e.g., cadmium telluride nanoparticles) suspended in a transparent polymer such as PS. The fins 108 may be made from a white, reflective polymer; the collimator 107 may be made from fused optical fibers; and the transparent substrate 104 may be made from transparent polymer. The attenuator 106 may be made from a film of tungsten-doped vanadium dioxide. The entire TSOD filter 100 may form a rigid panel or flexible appliqué film which can be affixed to transparent building materials such as windowpanes, glass spandrels, and glass blocks, either as a retrofit to existing structures or as a separately installable building structure.

Alternatively, the concentrating lens 110 and de-concentrating lens 111 may be combined as a single component, such as for example a transparent rod or optical fiber that is thin in the middle and flared at both ends. Such an arrangement makes it possible to replace transparent components (e.g., the substrate 104) with opaque components that are completely penetrated by an array of optical fibers. This may be done for reasons of cost, improved insulation, structural strength, or for other reasons.

Figure 7:
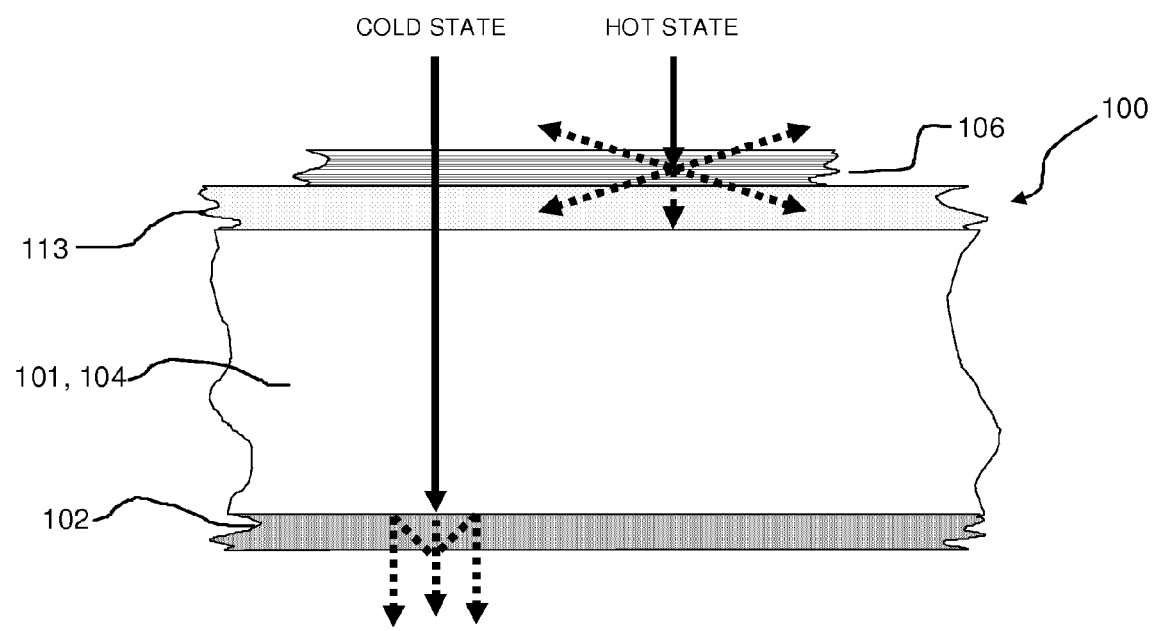
FIG. 7 is a schematic, cross-section representation of further embodiment of the TSOD filter, wherein the structural substrate and bandblock reflector have been combined into a single component, a thermochromic attenuator is employed near the "building exterior" side of the device, and the downconverter has been relocated to the "building interior" surface of the device.

FIG. 7 is a schematic representation of an additional embodiment of the TSOD filter 100, wherein the inner bandblock filter 103 has been deleted and the outer bandblock filter 101 has been combined with the transparent substrate 104 as a single component. In addition, the downconverter 102 is located at or near the "building interior" surface and a thermochromic attenuator 106 is located at or near the "building exterior" or sunward face of the device.

For purposes of this document, the term "thermochromic attenuator" should be understood to include not only passive devices which change color, opacity, attenuation or reflectivity in response to temperature, but also complex devices with multiple components. For example, an electrochromic attenuator, combined with a power supply, control system, and temperature sensor would serve the same function as a naturally thermochromic material and can be used interchangeably with it, although the device is not shown that way in FIG. 7.

In this embodiment, white light enters the attenuator 106, where it is absorbed or reflected in the hot state, so that minimal or no radiation is allowed into the interior of the TSOD filter 100. In the cold state, the thermochomic attenuator 106 is more transparent, so radiation (e.g., sunlight) is allowed to pass through the transparent substrate 104 and strike the downconverter 102.

Unlike other embodiments, the thermochromic downconverter 102 in this embodiment converts incoming radiation to a longer infrared wavelength (typically >5000 nm) such that at low temperatures its output radiation is reflected by the substrate 104. This allows the substrate 104 to act as a bandblock filter 101, so that the entire output of the downconverter 102 is reflected away from the interior of the TSOD filter 100 and out through the inner surface. At higher temperature, the output of the downconverter 102 shifts toward shorter frequencies, until a threshold temperature is crossed and the emitted radiation begins to exceed the cutoff wavelength of the substrate 104, and thus to fall within its passband. For typical transparent glasses and plastics, this passband occurs between the wavelengths of approximately 200 nm and approximately 5000 nm. In other words, the substrate is transmissive to radiation between these two wavelengths, and opaque (usually reflective) to radiation of longer or shorter wavelength. However, in the hot state the attenuator 106 will limit or prevent radiation from reaching the downconverter 102 and thus being re-emitted.

One advantage of this arrangement is that the "building interior" surface of the downconverter 102 can be painted any color, using virtually any paint chemistry, without altering the essential function of the downconverter 102. This is analogous to painting an old-fashioned steam radiator. Alternatively, the interior surface could be covered with a plaster, stucco, or other treatment, with or without a pigment.

In addition, this embodiment includes an optional layer of transparent insulation 113. In one exemplary embodiment, this insulation may consist of silica aerogel, possibly encapsulated by other transparent materials. However, other transparent materials can also be used, including but not limited to, glass or polymer beads or hollow spheres, bubble wrap, or sequentially stacked sheets of transparent material, whether rigid or flexible, that disrupt the conduction and convection of heat while having little effect on the radiant transmission of visible and near infrared light.

Figure 8:
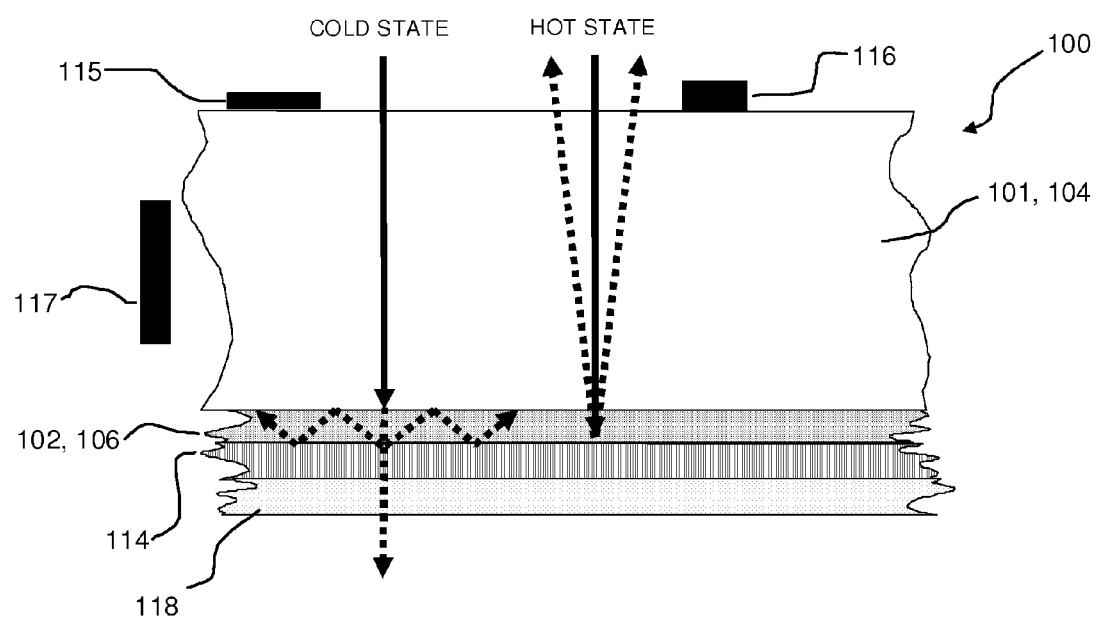
FIG. 8 is a schematic, cross-section representation of another embodiment of the TSOD filter, wherein the downconverter also serves as a thermochomic attenuator.

FIG. 8 is a schematic representation of still another embodiment of the invention, wherein the transparent substrate 104 and the outer bandblock filter 101 have been combined into a single component as in FIG. 7, and in addition the downconverter 102 and the thermochromic attenuator 106 have been combined into a single component.

In this embodiment, the attenuator 106 may take the form of a thermochromic or electrochromic material that is reflective (e.g., white, metallic, or mirrored) in the hot state and absorptive (e.g., black) in the cold state. For exemplary purposes, FIG. 8 shows the attenuator 106 as an electrochromic material whose color is controlled by a power supply 115, a temperature sensor 116, and a controller 117. In one implementation the power supply 115 is a photovoltaic cell, the temperature sensor 116 is a solid-state electronic sensor such as a thermocouple, the attenuator 106 and downconverter 102 consists of a two-color, high-contrast electrochromic material such as "electronic paper," and the controller 117 is a circuit board connected to the power supply 115 and temperature sensor 116 by wires. Methods for sensing temperature, regulating photovoltaic energy, and controlling the color of electrochromic materials, are well understood in the prior art and need not be elaborated here.

When white light (e.g., sunlight) enters the transparent substrate 104, it is passed through to the attenuator 106, which reflects it in the hot state so that it exits the device through the transparent substrate 104. In the cold state, incoming radiation is absorbed by the attenuator 106, which then heats up and re-emits the energy as long-wavelength infrared. Thus, the attenuator 106 also serves as a form of downconverter 102.

When this energy is re-emitted by the downconverter 102 in the cold state as infrared, the energy then reflects off the transparent substrate 104, as in FIG. 7 and is directed out through the "building interior" face of the TSOD filter 100. Alternatively, the energy may strike an optional mirror or broadband reflector 114, which reflects it back into the downconverter 102 again. The reader will note that in this circumstance, infrared light is not able to escape from the downconverter layer, and all interior heating is accomplished through conduction alone. In this case, the geometry and composition of the device will generally be designed such that conduction occurs predominantly in the desired (into the building) direction, with minimal leakage in the other direction.

In an alternative embodiment, the attenuator 106 is absorptive in the cold state but transmissive (e.g., transparent or translucent) in the hot state. In this embodiment, in the hot state the incoming white light passes through the attenuator 106 and strikes a mirror 114, which reflects it back out through the transparent substrate 114. In the cold state, the light is downconverted and then trapped in the downconverter as described above. However, this configuration is particularly effective at rejecting heat, i.e., directing radiant energy to the outside in the hot state.

FIG. 8 also shows an additional optional component: an energy-storing material 118, which absorbs heat from the downconverter 102 and re-releases it over a longer period of time. In one embodiment, the energy-storing material 118 is a phase-change material with a very large heat of fusion, with a melting temperature selected to be close to room temperature, or to some other desired temperature. Such materials—generally waxes or specialized salts—hold a constant temperature unless completely liquefied or completely solidified, and are thus good for smoothing out large changes in incoming radiation. An exemplary phase change wax that may be used for energy storage is common paraffin. Glauber's salt (sodium sulfate decahydrate) is a typical salt that may be used for energy storage in some implementations.

Figure 9:
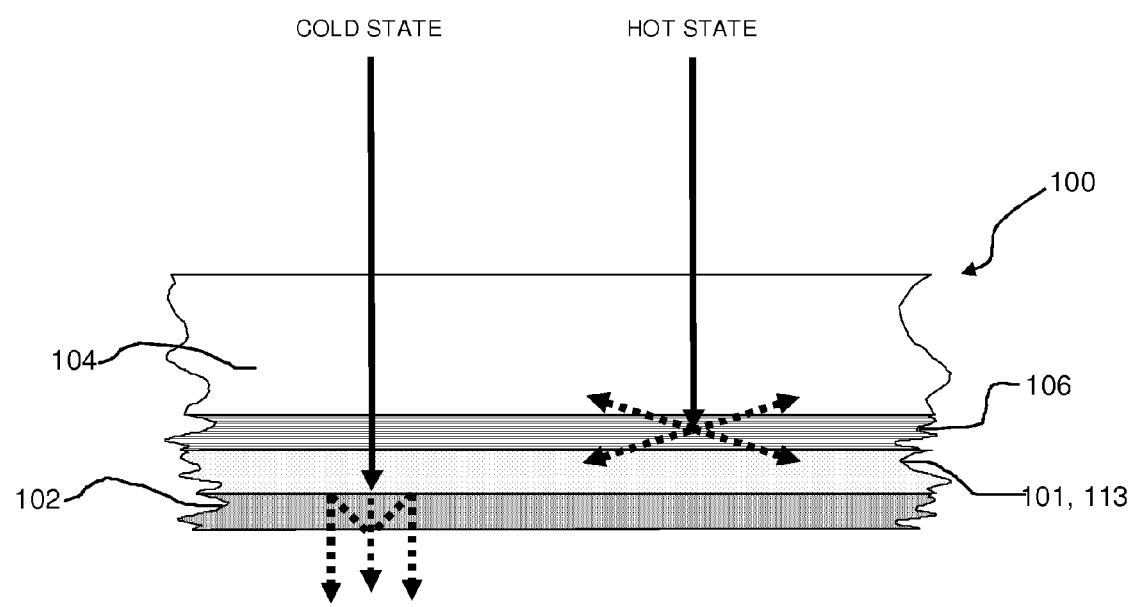
FIG. 9 is a schematic, cross-section representation of an additional embodiment of the TSOD filter, wherein a thermochromic attenuator is located on the inside surface of the transparent substrate, while the bandblock filter and transparent insulator have been combined as a single component.

FIG. 9 is a schematic representation of an additional embodiment of the TSOD filter 100, wherein the thermochromic attenuator 106 has been placed on the inside surface, rather than the outside surface, of the transparent substrate 104. In addition, the bandblock filter 101 and the transparent insulator 113 have been combined as a single component. This layer separates the attenuator 106 from the building interior, so that energy absorbed by the attenuator in the hot state is not re-radiated into the building interior. Ideally, the insulation value of the insulator 113 is significantly higher than that of the substrate 104, so that conductive heat transport out of the attenuator goes mainly to the building exterior, rather than the building interior. This arrangement also makes it convenient to employ the device as a retrofit for pre-existing transparent building components, including windows and glass block walls, and glass spandrels, turning them into active, heat-regulating wall elements that may or may not allow visible light through.

In the cold state, once incoming light has passed through the substrate 104, the attenuator 106, and the insulator 113/band reflector 101, it strikes the downconverter 102, where it is converted to infrared, re-radiated, and reflected off the band reflector 101, such that the energy is directed toward the building interior rather than the building exterior. It is also possible to have an air gap between the downconverter 102 and the insulator 113/band reflector 101, although this is generally less efficient because much of the energy released by the downconverter goes to heating this air gap rather than the building interior. In the extreme case, objects and surfaces within the building interior itself can serve as downconverters, although they will be inefficient in this role unless they are by nature highly absorptive and radiative. However, in this case the air gap and the air of the building interior are one and the same.

Figure 10:
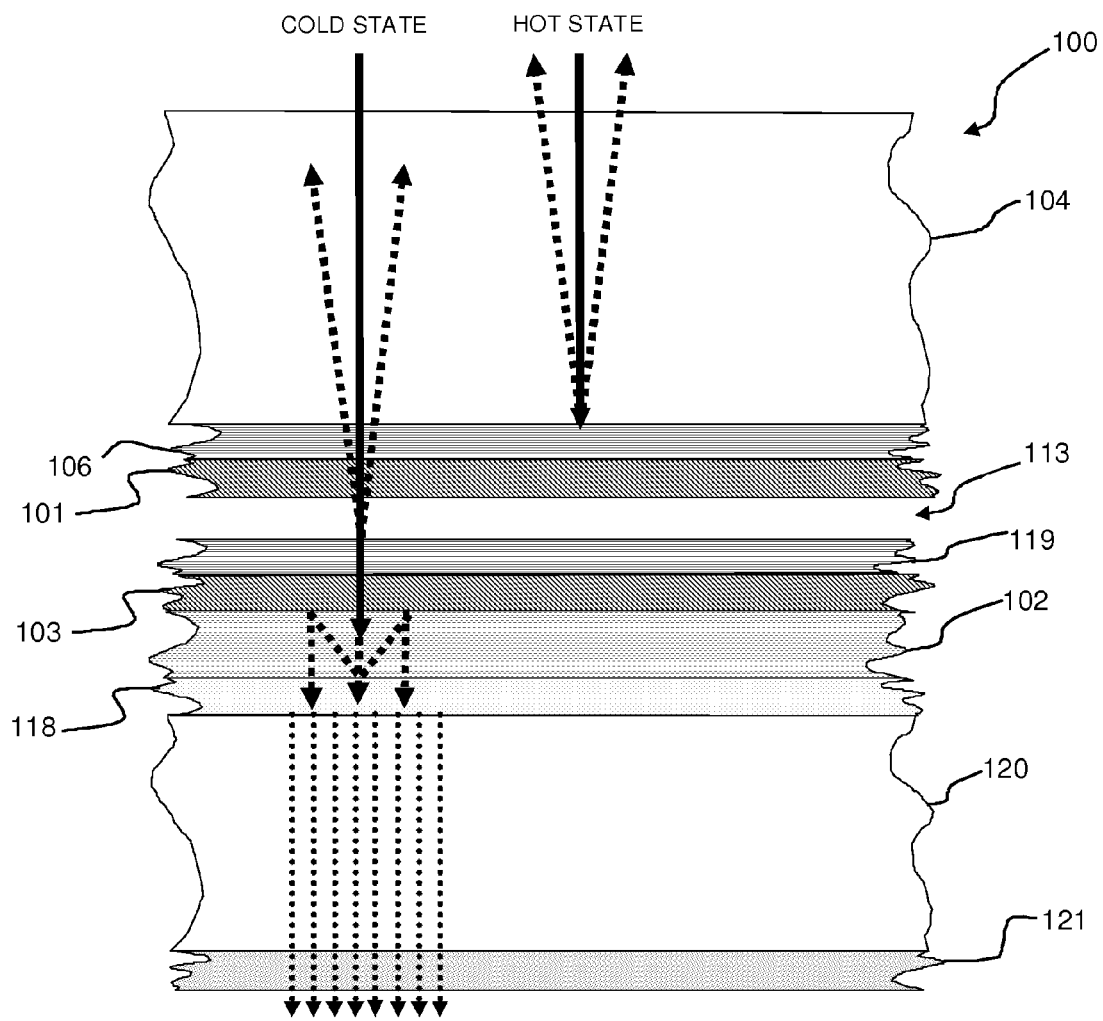
FIG. 10 is a schematic, cross-section representation of a further embodiment of the TSOD filter with potential specific application in the form of a spandrel.

FIG. 10 depicts an exemplary implementation of a TSOD filter 100 in the form of a glass spandrel for use in exterior cladding of buildings. Spandrels are often sections with a glass exterior (although opaque materials may be used as well) that span sections of a building between windows and appear as windows as well, but in fact enclose areas of the building housing mechanicals (e.g., the space above drop ceilings and the space behind floor radiators below windows. As shown in FIG. 10, the spandrel layers starting from the exterior of a building may include a pane of ordinary window glass 104 adjacent a thermochromic attenuator 106. An interior surface of the thermochromic attenuator 106 may be coated with a low-emissivity film 101, e.g., indium tin oxide, that acts as a bandblock. This low emissivity coating 101 is optional to the functionality of the TSOD filter 100 in this spandrel embodiment, but may be extremely helpful as described below.

A blackbody radiator, e.g., a steel plate painted black, may serve as the downconverter 102 and may be spaced apart from the thermochromic attenuator 106 to form an air gap 113. The air gap 113 serves as a transparent insulator as discussed in prior embodiments. The first low-emissivity coating 101 helps reduce heating of the air gap 113 by blocking much of the infrared energy within the incident light from reaching the air gap 113 and thus improving the insulating capacity of the air gap 113. A second low-emissivity coating 103, e.g., indium tin oxide, covers the exterior surface of the downconverter 102 to act as a bandblock. As shown in FIG. 10, a second thermochromic attenuator 119 may optionally be inserted into the air gap 113 between the downconverter 102 and the first thermochromic attenuator 106. If used, the second thermochromic attenuator should be in direct or indirect thermal contact with the energy-storing material 118 in order to respond to changes in the temperature of the energy-storing material 118.

A backplate 120 forms the interior surface of the spandrel. The backplate 120 may be another plate of glass or a sheet of plastic or metal. The backplate 120 is spaced apart from the downconverter 102 to form a gap. The gap is filled with an energy storing phase-change material 118, for example, a wax or a salt, that is present to store and release thermal energy. The interior surface of the backplate 120 may also be covered with an aesthetic surface treatment, for example, paint or thin stucco.

In operation, the first thermochromic attenuator 106 adjacent the glass 104 at the exterior side of the spandrel may be chosen to have a transition temperature at which the first thermochromic attenuator 106 blocks incident light when the ambient outside temperature is above 0°-10° C., for example. In this way, the incident light does not pass through the spandrel to heat the building on a moderately warm or hot day, thus reducing the cooling requirements for the building and conserving energy. However, when the ambient outside temperature is below 0°-10° C., for example, the thermochromic attenuator 106 passes the incident light through the TSOD filter 100 to the downconverter 102. The downconverter 102 absorbs the incident light and emits energy at infrared wavelengths. The second low-emissivity coating 103 reflects the majority of the infrared energy emitted from the downconverter 102 and prevents this energy from exiting the TSOD filter 100 at the exterior of the building. Thus, most of the infrared energy emitted by the downconverter 102 is directed to the energy storing phase change material 118.

The phase change material 118 stores the infrared energy as thermal energy, which is transferred to the interior of the building via conduction through the backplate 120. As long as the interior temperature of the building is less than the temperature of the phase change material 118, thermal conduction will transfer heat from the phase change material 118 to the building. However, once the phase change material 118 fully melts, it is unable to absorb any additional thermal energy and will radiate any excess thermal energy to the building as the air gap 113 effectively forecloses significant thermal transfer to the exterior of the building. This thermal runaway condition may be acceptable until the interior of the building reaches a desired room temperature. However, without further control of the TSOD filter 100 the phase change material 118 in thermal runaway could overheat the building.

The second thermochromic attenuator 119 may optionally be provided to regulate the potential thermal runaway and prevent overheating of the building. In such an implementation, the transition temperature of the second thermochromic attenuator 119 may be chosen to be approximately room temperature, e.g., 20° C. Thus, below room temperature the second thermochromic attenuator 119 passes all incident light through to the downconverter 102 to heat the phase change material 118. Note that due to the air gap 113, the second thermochromic attenuator 119 is insulated from the ambient outside temperature and will only be heated through thermal conduction from the phase change material 118 and the interior of the building. However, once the interior of the building reaches room temperature and thus the phase change material 118 and the downconverter 102 are also at room temperature, the second thermochromic attenuator 119 transitions to block the incident light from reaching the downconverter 102, even in the cold state as shown in FIG. 10, and thus prevents thermal runaway and excess heating of the interior of the building.

While several exemplary embodiments of the TSOD filter are depicted and described herein, it should be understood that the TSOD filter is not limited to these particular configurations. Optional components may be added or moved to suit the needs of a particular application or a particular manufacturing method, and degraded forms of some embodiments can be produced by, for example, deleting components such as one bandblock filter in an embodiment which normally contains two. A wide variety of other materials can be used to manufacture the TSOD filter, including, metals, ceramics, glasses, nanostructured and microstructured photonic materials, and even ices, liquids, and vapors. The TSOD filter may include features designed to enhance its thermal insulation properties including but not limited to air gaps, gas gaps, vacuum gaps, foams, beads, fiber pads, or aerogels. It may be thick and rigid enough to serve as a structural component of vehicles or building walls. It may be wrapped around or formed upon complex surfaces. It may be aesthetically enhanced with color or it may be camouflaged to resemble more conventional building materials. Thermochromic pigments may be added to certain surfaces to indicate when they are hot or cold. Mechanical enhancements may be added to reorient components, either to face them toward or away from incoming light, or to alter their wavelength response or apparent thickness. The exact arrangement of the various layers can be different than is depicted here, and (depending on the materials and wavelengths selected) different layers can be combined as single layers, objects, devices, or materials (for example, an energy-absorbing phase-change material that is also a thermochromic attenuator or band reflector), without altering the essential structure and function of the TSOD filter.

Although the description above contains many specificities, these should not be construed as limiting the scope of the invention but rather construed as merely providing illustrations of certain exemplary embodiments of this invention. There are various possibilities for making the device of different materials, and in different configurations. For example, the structure could be inflatable or could be optimized for use underwater or in vacuum instead of in normal air. The bandblock filters could be thermochromic, either in place of or in addition to any thermochromic properties of the downconverter. Although upconversion is generally less efficient than downconversion, an upconverter could be used in place of the downconverter for some applications, particularly if advances in upconversion technology improve the efficiency of the upconversion process. Such embodiments are explicitly claimed as part of the present invention.

Numerous other variations exist which do not affect the core principles of the operation of the TSOD filter. For example, downconverter could be composed of a single material such as phosphorus or silicon, could be composed of a compound semiconductor such as cadmium telluride, or could be composed of doped, nanostructured, or microstructured materials including, but not limited to, custom photonic crystals. The downconverter could be monocrystalline, polycrystalline, or amorphous. It could be a quantum well, an arrangement of quantum wires, or a "crystal" composed of regularly spaced quantum dots. It is even conceivable that the downconverter could be a liquid, a vapor, or a suspension of nanoparticles, nanowires, nanoflakes, etc., in some medium other than a solid polymer. One or more bandblock filters could be non-planar (e.g., parabolic) in shape, or other shaped reflectors or similar devices could be incorporated, to help concentrate incoming light from a variety of angles.

The use of the present invention as a thermally-regulating building material may be enhanced by careful positioning of the TSOD filter, for example by placing it under the eave on the south face of a house so that the TSOD filter is in full sunlight during winter days and is shadowed by the eave on summer days when the sun is higher in the sky. Alternatively, the TSOD filter can be used in place of traditional skylights, or as a panel or appliqué affixed to ordinary glass windows or glass blocks.

Although various embodiments of this invention have been described above with a certain degree of particularity, or with reference to one or more individual embodiments, those skilled in the art could make numerous alterations to the disclosed embodiments without departing from the spirit or scope of this invention. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A window comprising
a first pane of glass;
a first low emissivity coating on a surface of the first glass pane;
a thermochromic downconverter film supported by the first glass pane, wherein
the thermochromic downconverter film absorbs incident light of a broad bandwidth and emits light at an emission wavelength substantially or entirely longer than wavelengths of the broad bandwidth, and
the emission wavelength is variable depending upon a temperature of the downconverter layer; and
the first low emissivity coating blocks the emitted light when a temperature of the window is in a first range and passes the emitted light when the temperature of the window is in a second range.

2. The window of claim 1 further comprising a second low emissivity coating on the thermochromic downconverter film on an opposite side of the thermochromic downconverter film than the first low emissivity coating.

3. The window of claim 1 further comprising
a second low emissivity coating on the thermochromic downconverter film on an opposite side of the thermochromic downconverter film than the first low emissivity coating;
a second pane of glass spaced apart from the thermochromic downconverter film; and
a transparent insulating layer sandwiched between the second glass pane and the thermochromic downconverter film.

4. The window of claim 3, wherein the transparent insulating layer is an air gap.

5. The window of claim 3, wherein
the first low emissivity coating blocks the emitted light when the temperature of the thermochromic downconverter film is below a first threshold temperature and passes the emitted light when the temperature of the thermochromic downconverter film is above a second threshold temperature; and
the second low emissivity coating passes the emitted light when the temperature of the thermochromic downconverter film is below the first threshold temperature and blocks the emitted light when the temperature of the thermochromic downconverter film is above the second threshold temperature.

6. The window of claim 1 further comprising
a second pane of glass spaced apart from the thermochromic downconverter layer;
a second low emissivity coating on the second glass pane; and
a transparent insulating layer sandwiched between the second glass pane and the first low emissivity coating.

7. The window of claim 6, wherein the transparent insulating layer is an air gap.

8. The window of claim 6, wherein
the first low emissivity coating blocks the emitted light when the temperature of the thermochromic downconverter film is below a first threshold temperature and passes the emitted light when the temperature of the thermochromic downconverter film is above a second threshold temperature; and
the second low emissivity coating passes the emitted light when the temperature of the thermochromic downconverter film is below the first threshold temperature and blocks the emitted light when the temperature of the thermochromic downconverter film is above the second threshold temperature.

9. The window of claim 1 further comprising a thermochromic attenuator supported by the first glass pane.

10. The window of claim 9, wherein the thermochromic attenuator is positioned between the first glass pane and the first low emissivity coating whereby the first low emissivity coating covers a surface of the thermochromic attenuator instead of the surface of the first glass pane.

11. The window of claim 9, wherein the thermochromic attenuator comprises a liquid crystal plate.

12. The window of claim 9, wherein the thermochromic attenuator comprises a film of a thermochromic, optically reflective material.

13. The window of claim 9, wherein the thermochromic attenuator comprises a film of a thermochromic, infrared reflective material.

14. The window of claim 1, wherein the thermochromic downconverter film defines a plurality of transparent openings.

15. A method for regulating the flow of light and radiant heat comprising
absorbing incident light at multiple wavelengths with a downconverter;
emitting the incident light from the downconverter at an emission wavelength substantially or entirely longer than the wavelengths of the incident light; and
reflecting the emitted light with one or more bandblock filters, wherein
the emitted light escapes in an inward direction when an ambient temperature is in a first range;
the emitted light escapes in an outward direction when the ambient temperature is in a second range; and
the emitted light escapes in both the inward direction and the outward direction when the ambient temperature is between the first range and the second range.

16. The method of claim 15 further comprising passively and selectively passing and blocking the incident light with a thermochromic attenuator based upon the ambient temperature.

17. A method for regulating the temperature of a building comprising
cladding an exterior surface of at least a portion of the building with a layered material comprising a downconverter layer and one or more bandblock filters;
absorbing incident light at multiple wavelengths within the downconverter layer;
emitting the incident light from the downconverter layer at an infrared wavelength; and
reflecting the emitted light with one or more bandblock filters, wherein
the emitted light escapes in an inward direction when an ambient temperature is below a first threshold temperature;
the emitted light escapes in an outward direction when the ambient temperature is above a second threshold temperature; and
the emitted light escapes in both the inward direction and the outward direction when the ambient temperature is between the first threshold temperature and the second threshold temperature.

18. The method of claim 17, wherein the cladding further comprises a thermochromic attenuator layer and the method further comprises passively and selectively passing and blocking the incident light with the thermochromic attenuator layer based upon the ambient temperature.

* * * * *